(12) United States Patent
Mukasa

(10) Patent No.: US 11,719,879 B2
(45) Date of Patent: Aug. 8, 2023

(54) OPTICAL FIBER

(71) Applicant: FURUKAWA ELECTRIC CO., LTD., Tokyo (JP)

(72) Inventor: Kazunori Mukasa, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 75 days.

(21) Appl. No.: 17/388,187

(22) Filed: Jul. 29, 2021

(65) Prior Publication Data

US 2021/0356657 A1 Nov. 18, 2021

Related U.S. Application Data

(63) Continuation of application No. PCT/JP2020/003959, filed on Feb. 3, 2020.

(30) Foreign Application Priority Data

Feb. 5, 2019 (JP) .................................. 2019-019119

(51) Int. Cl.
*G02B 6/02* (2006.01)
*G02B 6/036* (2006.01)

(52) U.S. Cl.
CPC ..... *G02B 6/02395* (2013.01); *G02B 6/02004* (2013.01); *G02B 6/02009* (2013.01);
(Continued)

(58) Field of Classification Search
CPC ............ G02B 6/02004; G02B 6/02009; G02B 6/02238; G02B 6/02395; G02B 6/03627; G02B 6/0365
See application file for complete search history.

(56) References Cited

U.S. PATENT DOCUMENTS 6,901,196 B2 * 5/2005 Takahashi ............. C03C 25/607
385/124
7,164,830 B2 * 1/2007 Hiroishi ............. G02B 6/03666
385/127
(Continued)

FOREIGN PATENT DOCUMENTS

EP 3 438 715 A1 2/2019
EP 3 537 192 A1 9/2019
(Continued)

OTHER PUBLICATIONS

International Search Report dated Mar. 3, 2020 in PCT/JP2020/003959, filed on Feb. 3, 2020, 3 pages.
(Continued)

*Primary Examiner* — Ryan A Lepisto
(74) *Attorney, Agent, or Firm* — Oblon, McClelland, Maier & Neustadt, L.L.P.

(57) ABSTRACT

An optical fiber includes: a core portion made of glass; a cladding portion that is located on an outer periphery of the core portion and that is made of glass having a lower refractive index than a refractive index of the core portion; and a coating portion that covers an outer periphery of the cladding portion. Further, an average value of a relative refractive-index difference of a center core of the core portion is 0.1 to 0.5%, a fiber diameter including the coating portion is equal to or smaller than 220 µm, an effective cutoff wavelength is longer than 1260 nm and smaller than 1530 nm, and a mode field diameter of light at 1550 nm is equal to or larger than 9 µm.

15 Claims, 6 Drawing Sheets

(52) U.S. Cl.
CPC ....... *G02B 6/0365* (2013.01); *G02B 6/03627* (2013.01); *G02B 6/02238* (2013.01)

(56) References Cited

U.S. PATENT DOCUMENTS

| | | | | |
|---|---|---|---|---|
| 8,383,511 B2* | 2/2013 | Sukekawa | ............ | H01L 21/0337 257/E21.575 |
| 8,532,454 B2* | 9/2013 | Imamura | ............ | C03B 37/01222 385/127 |
| 8,737,793 B2* | 5/2014 | Imamura | ............... | G02B 6/0365 385/126 |
| 9,057,817 B2* | 6/2015 | Bookbinder | ......... | G02B 6/0365 |
| 9,594,210 B2* | 3/2017 | Bookbinder | ............. | C03C 3/06 |
| 9,964,697 B2* | 5/2018 | Maruyama | ............. | G02B 6/125 |
| 11,314,017 B2* | 4/2022 | Mukasa | ................. | G02B 6/02 |
| 2004/0264896 A1* | 12/2004 | Takahashi | .......... | G02B 6/02014 385/103 |
| 2011/0058780 A1* | 3/2011 | Han | ..................... | C23C 16/045 385/124 |
| 2012/0051703 A1* | 3/2012 | Bigot-Astruc | ....... | G02B 6/0365 385/124 |
| 2012/0134637 A1* | 5/2012 | Imamura | .............. | G02B 6/0365 385/127 |
| 2014/0029906 A1* | 1/2014 | Mukasa | ............... | G02B 6/0365 385/126 |
| 2014/0294355 A1* | 10/2014 | Bickham | ............ | G02B 6/02019 385/128 |
| 2014/0308015 A1 | 10/2014 | Bookbinder et al. | | |
| 2017/0131468 A1* | 5/2017 | Kawaguchi | .......... | G02B 6/0365 |
| 2018/0120503 A1* | 5/2018 | Bennett | ............. | G02B 6/02266 |
| 2018/0329137 A1* | 11/2018 | Yamamoto | ......... | G02B 6/02014 |
| 2019/0113678 A1* | 4/2019 | Nagasu | ............. | G02B 6/02019 |
| 2019/0278020 A1* | 9/2019 | Kawaguchi | ........ | G02B 6/02395 |
| 2019/0331850 A1* | 10/2019 | Bennett | ............. | G02B 6/02395 |
| 2019/0384000 A1* | 12/2019 | Tamura | .................... | G02B 6/44 |
| 2020/0333528 A1* | 10/2020 | Kawaguchi | ........ | G02B 6/03611 |

FOREIGN PATENT DOCUMENTS

| | | |
|---|---|---|
| EP | 3 591 450 A1 | 1/2020 |
| EP | 3 737 979 A1 | 11/2020 |
| EP | 3 788 421 A1 | 3/2021 |
| JP | 5-19144 A | 1/1993 |
| JP | 2016-519333 A | 6/2016 |
| JP | 2016-522428 A | 7/2016 |
| JP | 2018-189914 A | 11/2018 |
| JP | 2019-120894 A | 7/2019 |
| JP | 2019-152811 A | 9/2019 |
| WO | WO 2016/190297 A1 | 12/2016 |
| WO | WO 2017/170652 A1 | 10/2017 |
| WO | WO 2018/159146 A1 | 9/2018 |
| WO | WO 2019/138848 A1 | 7/2019 |

OTHER PUBLICATIONS

Extended European Search Report dated Oct. 19, 2022 in European Patent Application No. 20752810.0, 12 pages.

* cited by examiner

OPTICAL FIBER

CROSS-REFERENCE TO RELATED APPLICATION(S)

This application is a continuation of International Application No. PCT/JP2020/003959, filed on Feb. 3, 2020 which claims the benefit of priority of the prior Japanese Patent Application No. 2019-019119, filed on Feb. 5, 2019, the entire contents of which are incorporated herein by reference.

BACKGROUND

The present disclosure relates to an optical fiber.

Background

In the related art, in the fields of data communication and telecommunication, a small-diameter optical fiber has attracted attention as an optical fiber that realizes a high-density optical fiber cable. Therefore, studies on a small-diameter fiber to achieve high density have been actively performed.

For example, in International Publication No. WO 2016/190297, a fiber structure with a W-type profile, in which a trench layer equal to or larger than −0.08% is used adjacent to a center core, is proposed as a fiber structure that conforms to ITU-T (International Telecommunication Union) G.652 and G.657. Further, Japanese Laid-open Patent Publication No. H5-19144 proposes a fiber in which a secondary coating that is considered to be important to reduce a dimeter has a thickness equal to or smaller than 25 µm. Furthermore, International Publication No. WO 2018/159146 proposes a cutoff shifted fiber that has a fiber diameter (an outer diameter of a secondary coating) of 180 µm to 210 µm and a mode field diameter (MFD) of 10 to 13 µm at a wavelength of 1550 nm.

SUMMARY

There is a need for providing an optical fiber capable of adequately reducing a transmission loss even if a mode field diameter is increased.

Solution to Problem

According to an embodiment, an optical fiber includes: a core portion made of glass; a cladding portion that is located on an outer periphery of the core portion and that is made of glass having a lower refractive index than a refractive index of the core portion; and a coating portion that covers an outer periphery of the cladding portion. Further, an average value of a relative refractive-index difference of a center core of the core portion is 0.1 to 0.5%, a fiber diameter including the coating portion is equal to or smaller than 220 µm, an effective cutoff wavelength is longer than 1260 nm and smaller than 1530 nm, and a mode field diameter of light at 1550 nm is equal to or larger than 9 µm.

DETAILED DESCRIPTION

In the related art, in recent years, a need to increase the MFD is increasing in addition to a need to reduce a dimeter. In the related art, when a fiber diameter of a cutoff shifted fiber is to be reduced to less than 250 µm, there has been no guideline indicating a target range in which a relative refractive-index difference of a core portion needs to be set. Therefore, even if the MFD at 1550 nm is increased to 9 µm by setting the cutoff wavelength to a certain wavelength longer than 1260 nm to cope with the need to increase the MFD, a microbending loss will have a great influence if the relative refractive-index difference of the core portion is not appropriately set, so that when the optical fiber is made into an optical fiber cable state, a transmission loss may increase and it may become difficult to meet a standard. Therefore, to prevent the transmission loss, it is extremely important to set the relative refractive-index difference of the core portion to an optimal range, that is, to set a parameter indicating the relative refractive-index difference of the core portion to a range in which the transmission loss can be prevented in the optical fiber cable state.

Embodiments of the present disclosure will be described in detail below with reference to the drawings. The present disclosure is not limited by the embodiments described below. Further, in each of the drawings, the same or corresponding structural elements are appropriately denoted by the same reference symbols. Furthermore, in the present specification, a cutoff wavelength is a cable cutoff wavelength that is defined by ITU-T G.650.1. Moreover, other terms that are not specifically defined in the present specification conform to definitions and measurement methods described in G.650.1 and G.650.2.

Embodiment

Figure 1:
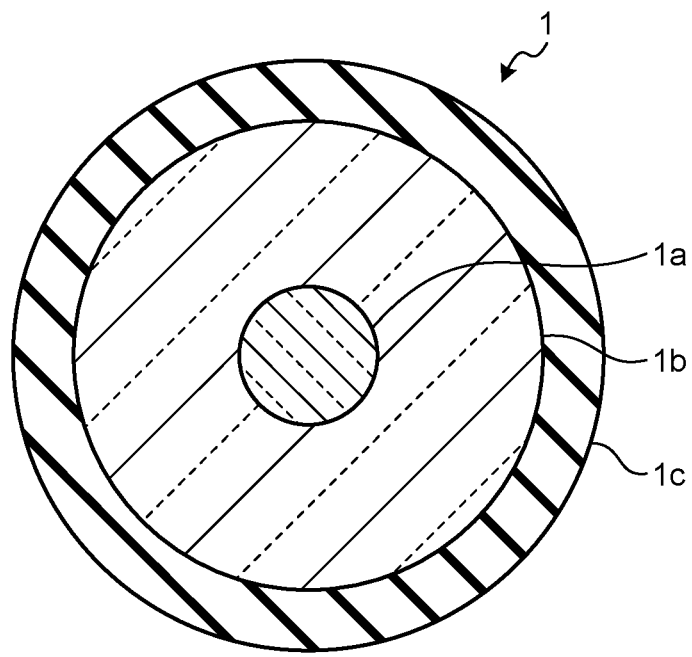
FIG. 1 is a schematic cross-sectional view of an optical fiber according to an embodiment.

FIG. 1 is a schematic cross-sectional view of an optical fiber according to an embodiment. An optical fiber 1 includes a core portion 1a that is located at an approximately center thereof, a cladding portion 1b that covers an outer periphery of the core portion 1a, and a coating portion 1c that covers an outer periphery of the cladding portion 1b.

Each of the core portion 1a and the cladding portion 1b is made of glass. The glass is silica based glass. The cladding portion 1b has a lower refractive index than a maximum refractive index of the core portion 1a. For example, the core portion 1a is made of silica glass doped with a dopant, such as germanium (Ge) or fluorine (F), for adjusting the refractive index. The cladding portion 1b is made of, for example, pure silica glass that does not contain a dopant for adjusting the refractive index. Further, an outer diameter (cladding diameter) of the cladding portion 1b is set to be small.

In the present embodiment, for comparison with a small-diameter optical fiber according to the embodiment, a single-mode optical fiber that conforms to G.652 standard will be referred to as a standard optical fiber (standard SMF). In general, the standard SMF has a resin coating portion with a thickness of about 62.5 μm on an outer periphery of a cladding portion. Therefore, an outer diameter of the resin coating portion is about 250 μm. In the small-diameter optical fiber according to the present embodiment, optimal setting will be described based on the assumption that a fiber diameter including the coating portion 1c, such as the resin coating portion, is equal to or smaller than 220 μm. Meanwhile, in the following, a "glass diameter" indicates a diameter of a glass portion (the core portion 1a and the cladding portion 1b) illustrated in the cross section in FIG. 1. Further, to distinguish between the "fiber diameter" and the "glass diameter", the "fiber diameter" indicates a diameter of the cross section illustrated in FIG. 1, in other words, an outer diameter of the optical fiber 1 including up to the coating portion 1c.

Figure 2A:
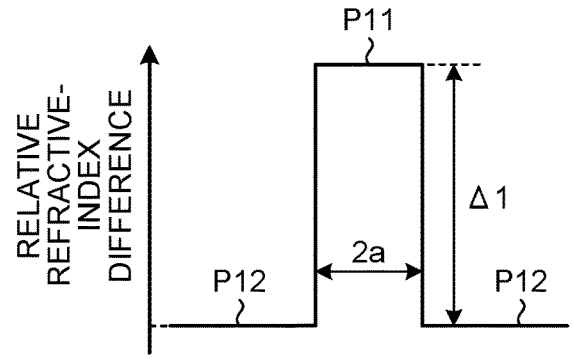
FIG. 2A is a schematic diagram of a step-type refractive index profile that is applicable to the optical fiber according to the embodiment.
Figure 2B:
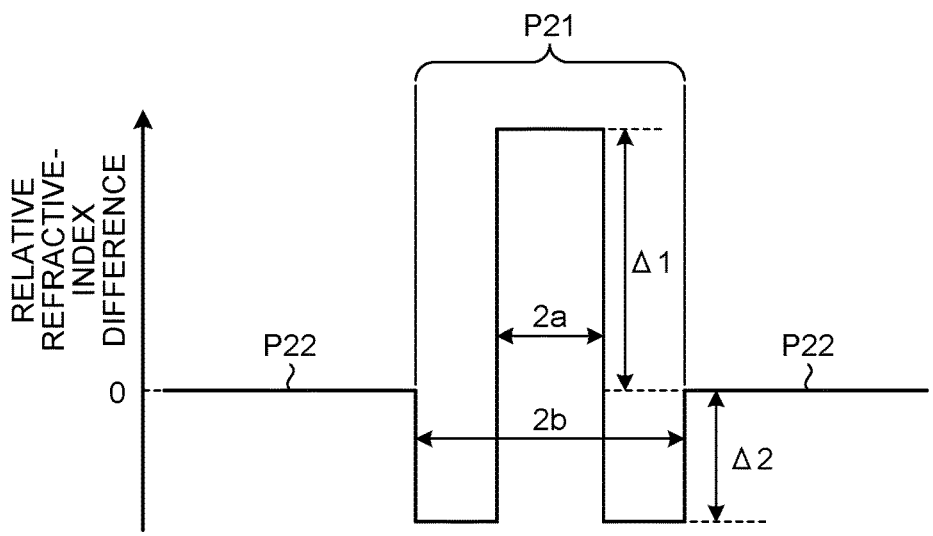
FIG. 2B is a schematic diagram of a W-type refractive index profile that is applicable to the optical fiber according to the embodiment.
Figure 2C:
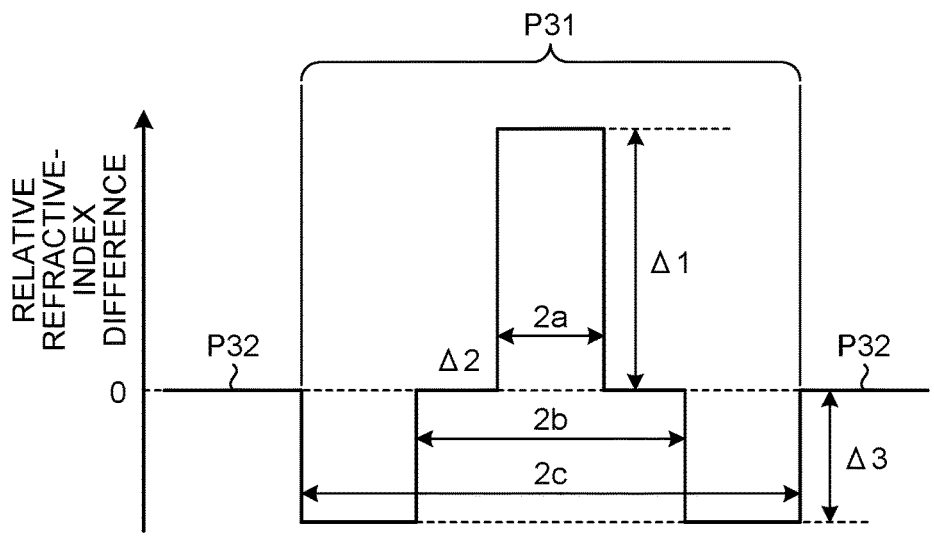
FIG. 2C is a schematic diagram of a trench-type refractive index profile that is applicable to the optical fiber according to the embodiment.

The optical fiber 1 has, for example, refractive index profiles as illustrated in FIG. 2A, FIG. 2B, and FIG. 2C.

Each of FIG. 2A, FIG. 2B, and FIG. 2C indicates a refractive index profile in a radial direction from a central axis of the core portion 1a of the optical fiber 1. FIG. 2A illustrates a step-type refractive index profile. In FIG. 2A, a profile P11 indicates a refractive index profile of the core portion 1a that is a center core, and a profile P12 indicates a refractive index profile of the cladding portion 1b. Meanwhile, the refractive index profile is indicated by a relative refractive-index difference (Δ) with respect to the cladding portion 1b. In the step-type refractive index profile as illustrated in FIG. 2A, a diameter (core diameter) of the core portion 1a is 2a, and a relative refractive-index difference of the core portion 1a with respect to the cladding portion 1b is Δ1.

FIG. 2B illustrates a W-type refractive index profile. In FIG. 2B, a profile P21 indicates a refractive index profile of the core portion 1a, and a profile P22 indicates a refractive index profile of the cladding portion 1b. In the W-type refractive index profile, the core portion 1a includes a center core with a diameter of 2a and a depressed layer that surrounds an outer periphery of the center core, that has a smaller refractive index than a refractive index of the cladding portion, that has an inner diameter of 2a, and that has an outer diameter of 2b. A relative refractive-index difference of the center core with respect to the cladding portion 1b is Δ1. A relative refractive-index difference of the depressed layer with respect to the cladding portion 1b is Δ2.

FIG. 2C illustrates a trench-type refractive index profile. In FIG. 2C, a profile P31 indicates a refractive index profile of the core portion 1a, and a profile P32 indicates a refractive index profile of the cladding portion 1b. In the trench-type refractive index profile, the core portion 1a includes a center core with a diameter of 2a, an intermediate layer that surrounds an outer periphery of the center core, that has a smaller refractive index than a refractive index of the center core, that has an inner diameter of 2a, and that has an outer diameter of 2b, and a trench layer that surrounds an outer periphery of the intermediate layer, that has a smaller refractive index than a refractive index of the cladding portion, that has an inner diameter of 2b, and that has an outer diameter of 2c. A relative refractive-index difference of the center core with respect to the intermediate layer is Δ1. A relative refractive-index difference of the intermediate layer with respect to the cladding portion 1b is Δ2. Meanwhile, Δ2 is generally set to 0% or close to 0%, for example, in a range from −0.2% to 0.2%. A relative refractive-index difference of the trench layer with respect to the cladding portion 1b is Δ3.

Referring back to FIG. 1, the coating portion 1c is made of, for example, resin, and has a function to protect the glass portion of the optical fiber 1. The coating portion 1c is a coating made of, for example, UV-curable resin, and has a layer structure including a single layer or two or more layers. If the coating portion 1c is a coating having a two-layer structure (two-layer coating), the coating portion 1c includes a primary coating layer that is located on the cladding portion side, and a secondary coating layer that is located on the outer peripheral side of the primary coating layer. Examples of UV-curable resin used for the coating portion 1c include urethane acrylate-based, polybutadiene acrylate-based, epoxy acrylate-based, silicone acrylate-based, and polyester acrylate-based, but UV-curable resin is not specifically limited as long as the material is available for coating of an optical fiber.

The optical fiber 1 according to the present embodiment has the configuration as described above and has a small fiber diameter equal to or smaller than 220 μm. Further, as will be described later, a relative refractive-index difference in the refractive index profile is set in an optimal range. This makes it possible to prevent an influence of the microbending loss due to an increase in a mode field diameter (MFD).

The present inventors performed studies as described below in order to realize a small-diameter optical fiber that prevents the influence of the microbending loss due to an increase in the MFD.

First, to realize a small-diameter optical fiber, it is important that a leakage loss is small. It is preferable to reduce the leakage loss to 0.1 dB/km or less at a wavelength of 1625 nm (that is, light at 1625 nm), for example. Further, it is more preferable to reduce the leakage loss to 0.01 dB/km or less at a wavelength of 1625 nm. Furthermore, it is preferable that a bending loss at a wavelength of 1625 nm when winding is made with a diameter of 30 mm is equal to or smaller than 2 dB/100 turn. Moreover, to reduce a connection loss when the small-diameter optical fiber is optically connected to the standard SMF, it is preferable that the small-diameter optical fiber has an MFD equal to or larger than 9 μm at a wavelength of 1550 nm (light at 1550 nm). Therefore, simulation calculation was performed with respect to various combinations of parameters related to the refractive index profiles as illustrated in FIG. 2A to FIG. 2C, and optical characteristics of an optical fiber in each of the combinations were calculated.

Figure 3:
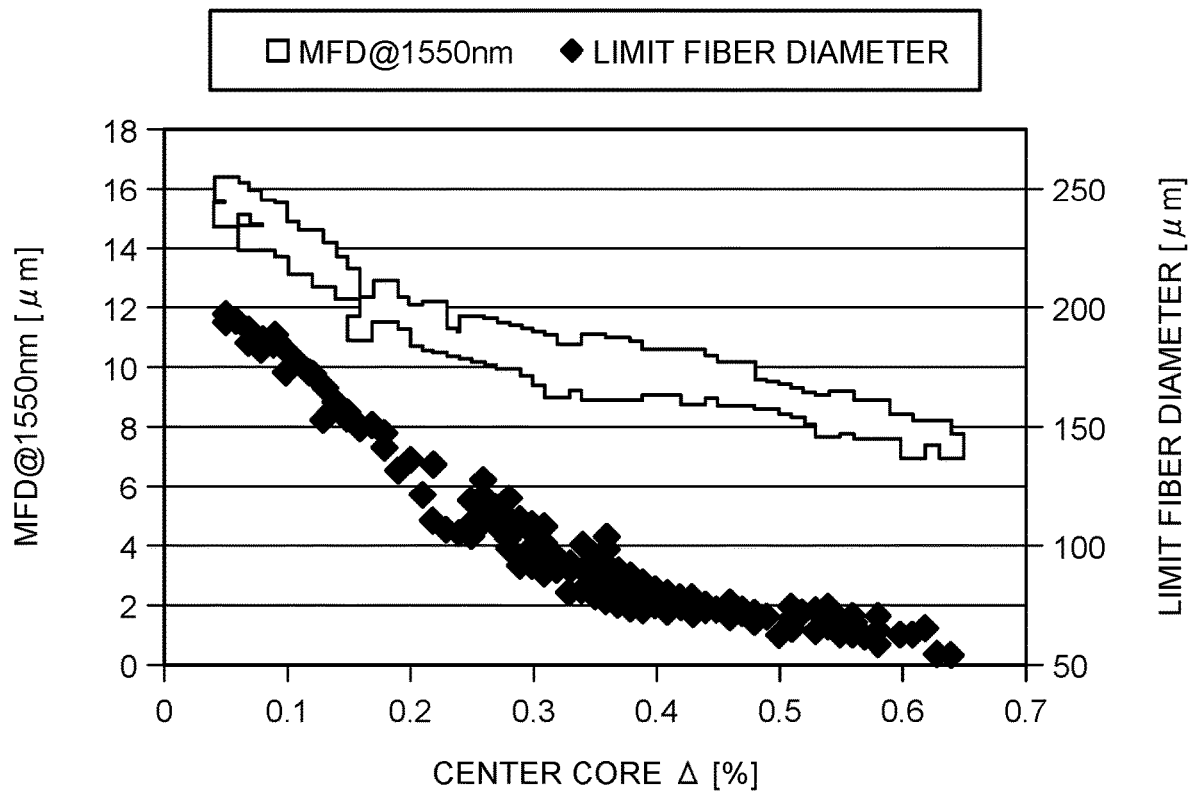
FIG. 3 is a diagram illustrating an example of a relationship between a center core $\Delta$ and an MFD or a limit fiber diameter.

FIG. 3 is a diagram illustrating an example of a relationship between the center core Δ and the MFD or the limit fiber diameter based on results of calculation as described above. Here, the center core Δ indicates the relative refractive-index difference Δ1 of the center core. Further, in FIG. 3, data points are represented by white squares and black diamonds. Illustration of contours of individual data points of overlapping data points is omitted.

FIG. 3 illustrates results of simulation calculation in a case where the effective cutoff wavelength is in a range of 1260 nm to 1550 nm, dispersion at 1550 nm is equal to or smaller than 23 ps/nm/km, and a dispersion slope is equal to or smaller than 0.07 ps/nm$^2$/km. To achieve the fiber diameter equal to or smaller than 220 μm, it is desirable that the fiber diameter is equal to the fiber glass diameter+40 μm or more and it is preferable that the glass diameter is equal to or smaller than 180 μm, in consideration of protection by coating, a microbending loss prevention effect, a process operability, and the like. In this case, it can be understood from FIG. 3 that it is preferable that the center core Δ is equal to or larger than 0.1%, although it is natural that fluctuation may occur depending on the profile. Furthermore, it can be understood that the MFD at 1550 nm is approximately 15 μm or less if the center core is equal to or larger than 0.1%. In contrast, it can be understood that it is preferable that the center core Δ is equal to or smaller than 0.5% in order to increase the MFD at 1550 nm to 9 μm or more. Therefore, it can be understood that an effective range of the center core Δ to obtain the MFD equal to or larger than 9 μm at 1550 nm when the fiber diameter is equal to or smaller than 220 μm is 0.1 to 0.5%.

Next, results of studies on the microbending loss will be described. First, a relationship between a leakage loss of the MFD-increased fiber (the optical fiber in which the MFD is increased) at 1625 nm and a transmission loss at 1550 nm in a state in which the fiber is wound around a bobbin (hereinafter, may be referred to as a bobbin state) will be described.

Figure 4:
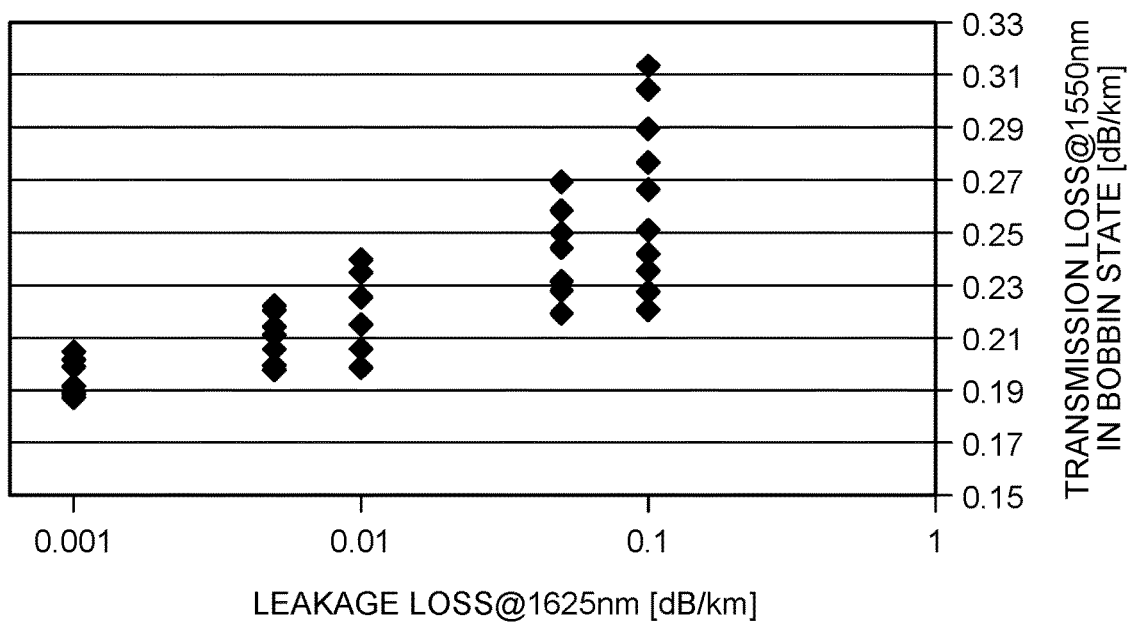
FIG. 4 is a diagram illustrating an example of a relationship between a light leakage loss of an MFD-increased fiber at 1625 nm and a transmission loss at 1550 nm in a state in which the fiber is wound around a bobbin.

FIG. 4 is a diagram illustrating an example of a relationship between the leakage loss of the MFD-increased fiber at 1625 nm and the transmission loss at 1550 nm in the bobbin state. It can be understood from FIG. 4 that the leakage loss with the light at 1625 nm is reduced to less than 0.1 dB/km. If a profile in which the transmission loss of light at 1550 nm is equal to or smaller than 0.22 dB/km is selected, it is possible to reduce the leakage loss with the light at 1625 nm to less than 0.01 dB/km, which is more preferable.

The transmission loss illustrated in FIG. 4 is caused by the leakage loss or the microbending loss. It may be understood from FIG. 4 that the leakage loss and the microbending loss have a certain fixed relationship, but does not have a 1:1 relationship. Therefore, it is preferable that the microbending loss of light at 1550 nm is ten-times or less as compared to a normal SMF, that is, the standard SMF with a glass diameter of 125 μm and a fiber diameter of 250 μm.

Furthermore, it is desirable to measure the microbending loss by an abrasive-paper method (an extension drum method or a fixed diameter drum method) or a wire mesh method. For example, it is desirable to perform the measurement by a method described in JIS C6823: 2010_10. However, other microbending measurement methods (for example, an oblique winding method) may be applied as long as they do not contradict the intention of the disclosure.

Next, standardized microbending loss characteristics for the standard SMF when the glass diameter, a primary thickness, and a secondary thickness are changed after selecting some of the fiber profiles as illustrated in FIG. 4 will be described. Here, the primary thickness is a thickness of the primary coating layer. The primary thickness is calculated by (primary diameter (diameter)−glass diameter (diameter))/2. The primary diameter is a diameter up to the primary layer in the cross section of the optical fiber. In contrast, the secondary thickness is a thickness of the secondary coating layer. The secondary thickness is calculated by (secondary diameter (diameter)−primary diameter (diameter))/2. The secondary diameter corresponds to the fiber diameter.

Figure 5:
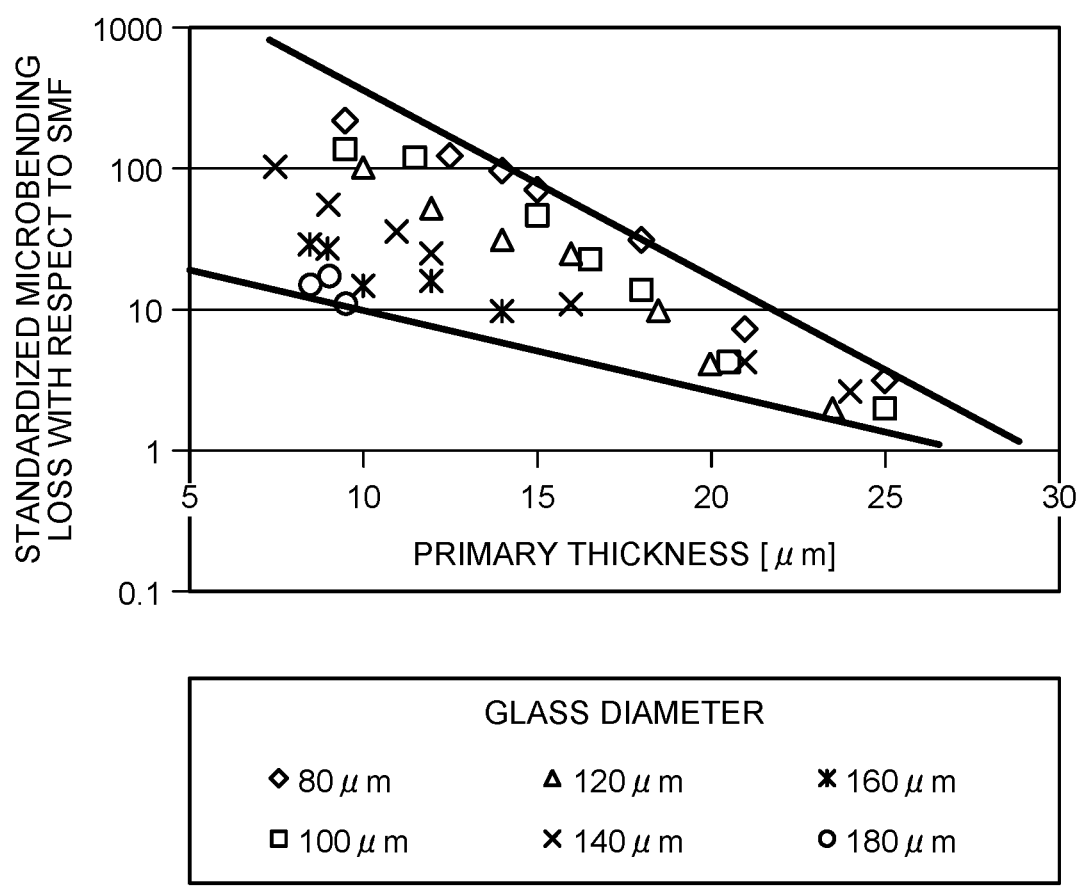
FIG. 5 is a diagram illustrating an example of a relationship between a primary thickness and a standardized microbending loss.
Figure 6:
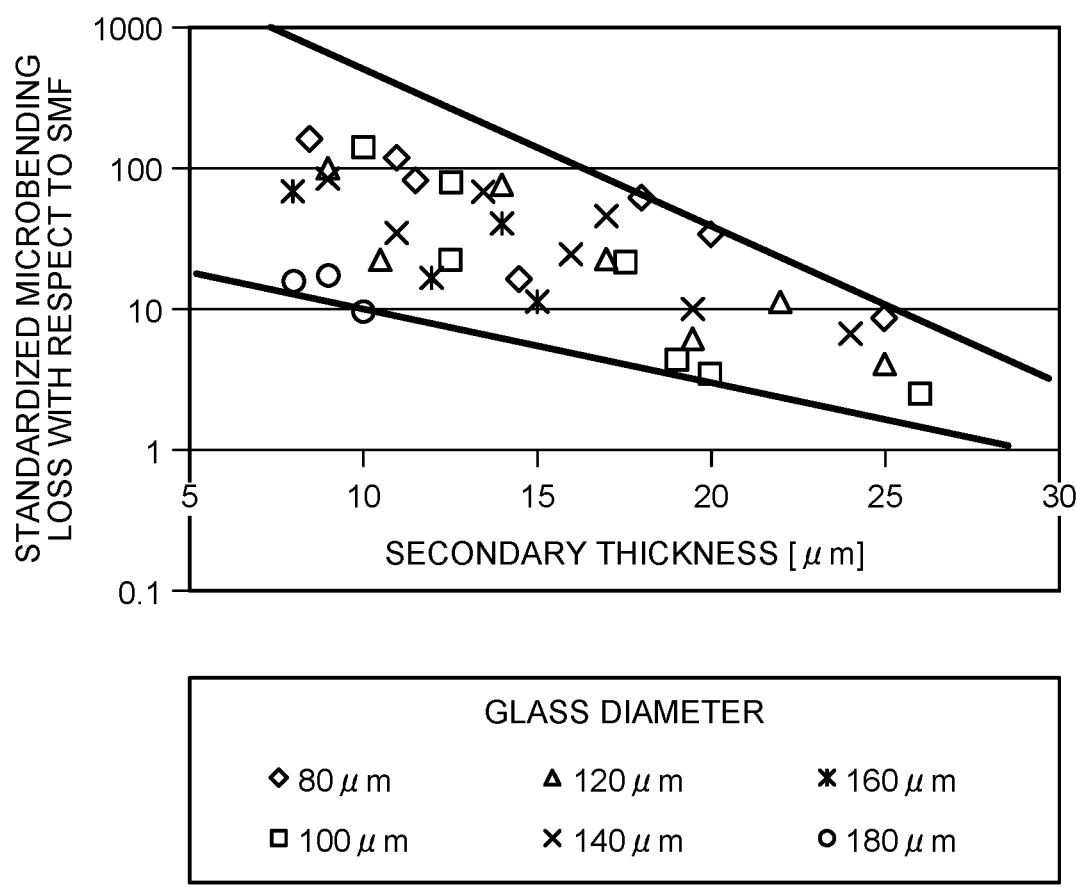
FIG. 6 is a diagram illustrating an example of a relationship between a secondary thickness and the standardized microbending loss.

FIG. 5 is a diagram illustrating an example of a relationship between the primary thickness and the standardized microbending loss. FIG. 6 is a diagram illustrating an example of a relationship between the secondary thickness and the standardized microbending loss. It is understood from FIG. 5 and FIG. 6 that the microbending loss with respect to the secondary thickness has larger fluctuation as compared to fluctuation of the microbending loss with respect to the primary thickness, but in a small-diameter fiber that has an MFD larger than 9 μm at 1550 nm, has a glass diameter equal to or larger than 80 μm and equal to or smaller than 180 μm at a cutoff wavelength of 1260 to 1530 nm, and has a fiber diameter equal to or smaller than 220 μm, there is no solution that meets the microbending loss unless both of the primary thickness and the secondary thickness are set to at least 10 μm or more. Meanwhile, characteristics similar to an optical fiber that conforms to ITU-T G.654 (what is called a cutoff shifted fiber) are realized. This is preferable characteristics for commercial application of a fiber with a cutoff wavelength longer than 1260 nm.

By setting dimensions of the optical fiber according to the present embodiment on the basis of the simulation results as described above, even in a small-diameter fiber with a fiber diameter equal to or smaller than 220 μm, it is possible to increase the MFD at a wavelength of 1550 nm to 9 μm or more and adequately prevent an influence of the microbending loss based on an increase in the MFD. In other words, it is possible to adequately reduce the transmission loss even if the MFD is increased.

EXPERIMENTAL EXAMPLE

By setting the optical fiber in an optimal range obtained by the simulation as described above, it is possible to realize an optical fiber that has an MFD equal to or larger than 9 μm at 1550 nm, that has the effective cutoff wavelength of 1260 to 1530 nm, and that has a fiber diameter equal to or smaller than 220 μm. Therefore, experimental results that were obtained by making prototype optical fibers with various settings within the optimal range and performing measurement will be described below.

Table 1 below is a table that lists optimal ranges of parameters in each of profiles obtained by simulation. Prototype small-diameter fibers were made based on values included in the optimal ranges listed in Table 1 and experiments were performed. Meanwhile, a top portion of the refractive index profile of the core portion 1a is not always flat. It is preferable that an average value of the relative refractive-index difference of the top portion in a manufacturing design range of the core diameter 2a is 0.10% to 0.50% in order to obtain desired characteristics.

TABLE 1

|           | Δ1 [%]     | Δ2 [%]          | Δ3 [%]        | b/a        | c/a        |
|-----------|------------|-----------------|---------------|------------|------------|
| Step type | 0.1 to 0.5 | —               | —             | —          | —          |
| W type    |            | −0.7 to −0.05   | —             | 1.5 to 6.0 | —          |
| Trench type |          | −0.2 to 0.2     | −0.7 to −0.1  | 1.5 to 5.0 | 2.0 to 7.0 |

Next, as small-diameter fibers, two types were prepared by a method of using a silica cladding in which a center core was doped with Ge to increase a refractive index as compared to pure silica glass, and a method of using a center core that was made of pure silica glass or that contained a dopant that did not largely increase the refractive index and using a cladding that is doped with F to reduce a refractive index as compared to pure silica glass. Further, the microbending loss was measured by using a drum method described in JIS C6823: 2010_10. Meanwhile, a leakage loss equal to or smaller than 0.1 dB/km at 1625 nm in the simulation was selected, and it was confirmed that the leakage loss as obtained by the simulation was actually obtained. Characteristics of the leakage loss were confirmed by separately generating a prototype fiber having the same profile and a sufficiently large glass diameter (for example, 200 to 500 µm), in this case, 300 µm, as compared to the glass diameter of the prototype optical fiber, measuring a loss in a state in which each of the fibers is wound, and obtaining the characteristics from a difference in the transmission loss. Results of the experiments by the methods as described above will be described below with reference to FIG. 7 and FIG. 8.

Figure 7:
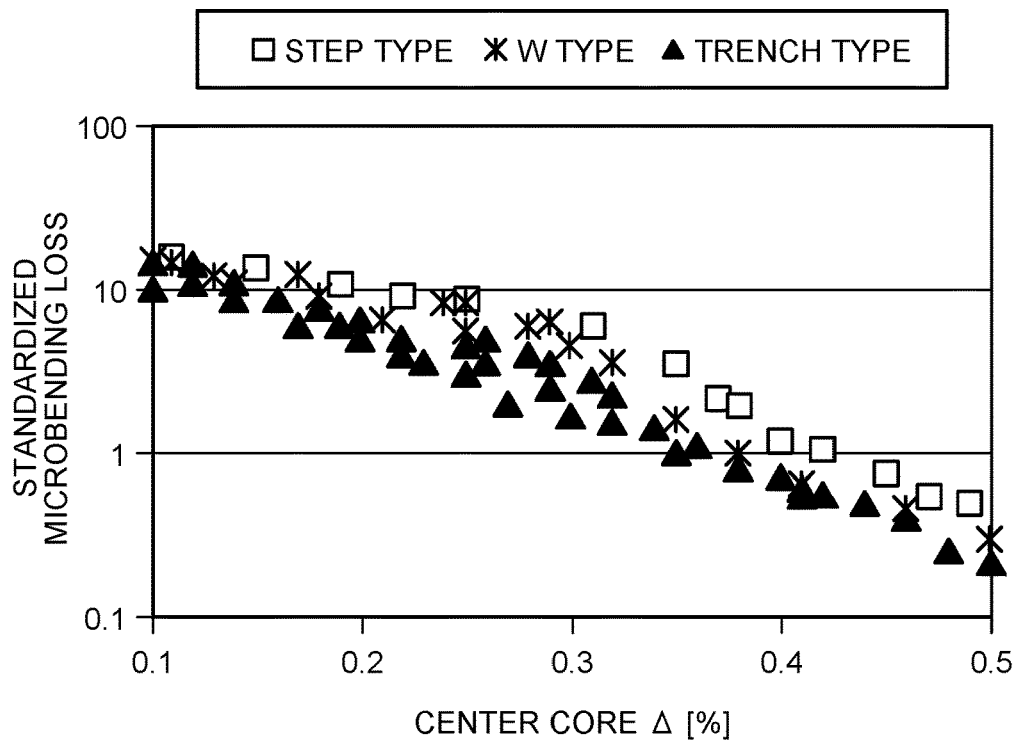
FIG. 7 is a diagram illustrating an example of a relationship between the center core $\Delta$ and the microbending loss in a step type, a W type, and a trench type.

FIG. 7 is a diagram illustrating an example of a relationship between the center core Δ and the microbending loss in a step type, a W type, and a trench type. FIG. 7 illustrates results in which good microbending loss characteristics were obtained. It can be understood from the results of the experiments that the microbending loss is changed in proportion to the center core Δ. It can be understood that, while fluctuation is caused by parameters other than the profile, the center core Δ is an important parameter to reduce the microbending loss. Therefore, based on the results, it has been confirmed that, even if the optical fiber is reduced to 220 µm or less, as long as the center core Δ is set to 0.10 to 0.50%, it is possible to reduce the standardized microbending loss to 10 or less as compared to the single-mode optical fiber in the related art, while ensuring good optical characteristics that match G.654.

Figure 8:
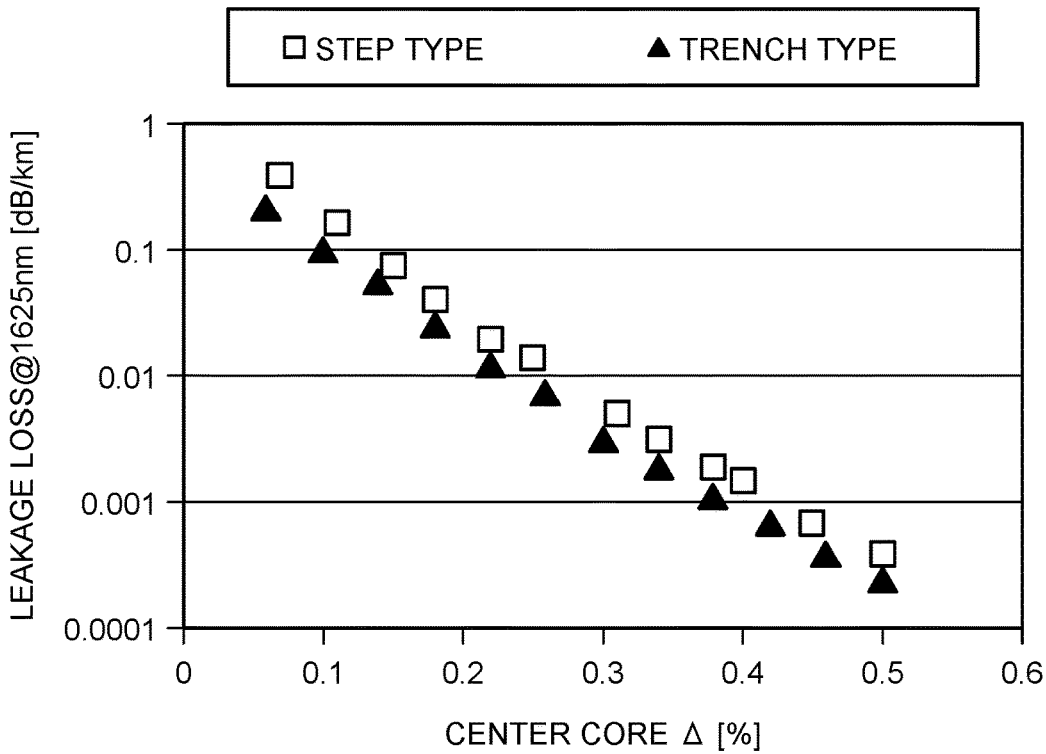
FIG. 8 is a diagram illustrating an example of a relationship between the center core $\Delta$ and a light leakage loss at 1625 nm in the step type and the trench type.

FIG. 8 is a diagram illustrating an example of a relationship between the center core Δ and the leakage loss at 1625 nm in the step type and the trench type. In this experiment, a prototype optical fiber having a glass diameter of 125 µm and a fiber diameter of 200 µm and a prototype optical fiber having a glass diameter of 300 µm and a fiber diameter of 500 µm were generated, and a transmission loss difference at 1625 nm between the two prototype optical fibers was defined as the leakage loss. As illustrated in FIG. 8, it can be understood, from the state in which the leakage loss is changed in proportion to the center core Δ, that the leakage loss is closely related to the center core Δ. Further, it has been confirmed from FIG. 8 that as long as the center core Δ is set to 0.10 to 0.50%, it is possible to reduce the leakage loss at 1625 nm to 0.1 dB/km or less.

With the configuration as described above, it is possible to realize a small-diameter fiber that has a fiber diameter equal to or smaller than 220 µm, a cutoff wavelength of 1260 to 1530 nm, and an MFD equal to or larger than 9 µm at 1550 nm, and that is highly resistant to the microbending loss.

Next, examples of one embodiment as described above will be described. Table 2 and Table 3 below list examples 1 to 53. In the examples 1 to 10, the optical fiber 1 that has a step-type (single-peaked type) refractive index profile and that includes the core portion 1a made of pure silica glass or a material containing a dopant that does not largely increase the refractive index, and the cladding portion 1b doped with F such that the refractive index is reduced as compared to pure silica glass is used. In the examples 1 to 53, the optical fiber 1 that has a W-type or a trench-type refractive index profile, that includes the core portion 1a doped with Ge such that the refractive index is higher than pure silica glass, and that includes the cladding portion 1b made of pure silica glass is used.

Further, in the optical fiber 1 of the examples 1 to 53, the glass diameter is set to a minimum value with which the leakage loss at 1625 nm is equal to or smaller than 0.001 dB/km. Furthermore, a primary thickness (P thickness) and a secondary thickness (S thickness) of the optical fiber 1 are set to minimum values with which the microbending loss is five times larger than that of the standard SMF. Meanwhile, the microbending loss is measured by a drum method described in JIS C6823: 2010_10. These values may be set to different values within the range of the present disclosure in order to change a target for the leakage loss or the microbending loss or in consideration of handling performance. Furthermore, in each of the refractive index profiles, it is possible to obtain a higher relative refractive-index difference or a lower relative refractive-index difference by adjusting the core diameter. In this point, in the examples, examination was made by adopting 0.35% to 0.42%, which is relatively close to the SMF in the related art, in consideration of mass productivity.

TABLE 2

| Example | Profile | Δ1 [%] | Δ2 [%] | Δ3 [%] | b/a | c/a | a [µm] | glass diameter [µm] | P thickness [µm] | S thickness [µm] | Fiber diameter [µm] | Transmission loss (1550 nm) [dB/km] | λ cc [nm] | MFD (1550 nm) [µm] |
|---|---|---|---|---|---|---|---|---|---|---|---|---|---|---|
| 1 | Step type | 0.42 | — | — | — | — | 9 | 72 | 20 | 20 | 152 | 0.171 | 1340 | 9.71 |
| 2 | Step type | 0.4 | — | — | — | — | 9 | 75 | 22 | 20 | 159 | 0.170 | 1308 | 9.87 |
| 3 | Step type | 0.4 | — | — | — | — | 10 | 71 | 24 | 22 | 163 | 0.172 | 1456 | 10.25 |
| 4 | Step type | 0.39 | — | — | — | — | 9 | 77 | 23 | 21 | 165 | 0.170 | 1290 | 9.96 |
| 5 | Step type | 0.39 | — | — | — | — | 10 | 73 | 22 | 22 | 161 | 0.171 | 1437 | 10.33 |
| 6 | Step type | 0.38 | — | — | — | — | 9 | 79 | 24 | 23 | 173 | 0.169 | 1274 | 10.05 |
| 7 | Step type | 0.38 | — | — | — | — | 10 | 74 | 25 | 24 | 172 | 0.170 | 1419 | 10.41 |
| 8 | Step type | 0.37 | — | — | — | — | 10 | 76 | 24 | 23 | 170 | 0.168 | 1400 | 10.50 |
| 9 | Step type | 0.36 | — | — | — | — | 10 | 77 | 26 | 24 | 177 | 0.167 | 1378 | 10.59 |
| 10 | Step type | 0.35 | — | — | — | — | 10 | 79 | 27 | 25 | 183 | 0.166 | 1360 | 10.69 |
| 11 | W type | 0.36 | −0.4 | — | 1.5 | — | 12 | 72 | 24 | 23 | 166 | 0.184 | 1437 | 9.95 |
| 12 | W type | 0.36 | −0.4 | — | 2 | — | 12 | 68 | 23 | 22 | 158 | 0.185 | 1459 | 9.89 |
| 13 | W type | 0.36 | −0.6 | — | 1.5 | — | 12 | 70 | 22 | 22 | 158 | 0.186 | 1398 | 9.57 |
| 14 | W type | 0.36 | −0.6 | — | 2 | — | 12 | 59 | 21 | 21 | 143 | 0.187 | 1434 | 9.53 |
| 15 | W type | 0.36 | −0.7 | — | 1.5 | — | 12 | 72 | 20 | 21 | 154 | 0.186 | 1384 | 9.42 |

TABLE 2-continued

| Example | Profile | Δ1 [%] | Δ2 [%] | Δ3 [%] | b/a | c/a | a [μm] | glass diameter [μm] | P thickness [μm] | S thickness [μm] | Fiber diameter [μm] | Transmission loss (1550 nm) [dB/km] | λ cc [nm] | MFD (1550 nm) [μm] |
|---|---|---|---|---|---|---|---|---|---|---|---|---|---|---|
| 16 | W type | 0.36 | −0.7 | — | 2 | — | 12 | 64 | 20 | 20 | 144 | 0.188 | 1436 | 9.40 |
| 17 | Trench type | 0.36 | 0 | −0.4 | 2.5 | 3 | 9 | 78 | 20 | 21 | 160 | 0.183 | 1299 | 10.16 |
| 18 | Trench type | 0.36 | 0 | −0.4 | 3 | 3.5 | 9 | 78 | 21 | 22 | 164 | 0.184 | 1312 | 10.24 |
| 19 | Trench type | 0.36 | 0 | −0.4 | 3.5 | 4 | 9 | 78 | 22 | 22 | 166 | 0.184 | 1324 | 10.27 |
| 20 | Trench type | 0.36 | 0 | −0.4 | 4 | 4.5 | 9 | 77 | 23 | 23 | 169 | 0.184 | 1336 | 10.25 |
| 21 | Trench type | 0.36 | 0 | −0.4 | 4.5 | 5 | 9 | 76 | 23 | 23 | 168 | 0.185 | 1331 | 10.28 |
| 22 | Trench type | 0.36 | 0 | −0.4 | 5 | 5.5 | 9 | 75 | 24 | 24 | 171 | 0.186 | 1346 | 10.26 |
| 23 | Trench type | 0.36 | 0 | −0.4 | 2 | 3 | 9 | 74 | 19 | 20 | 152 | 0.183 | 1304 | 9.95 |
| 24 | Trench type | 0.36 | 0 | −0.4 | 3 | 4 | 9 | 73 | 20 | 21 | 155 | 0.183 | 1363 | 10.25 |
| 25 | Trench type | 0.36 | 0 | −0.4 | 4 | 5 | 9 | 72 | 21 | 22 | 158 | 0.184 | 1402 | 10.28 |
| 26 | Trench type | 0.36 | 0 | −0.4 | 5 | 6 | 9 | 74 | 22 | 24 | 166 | 0.184 | 1402 | 10.28 |
| 27 | Trench type | 0.36 | 0 | −0.6 | 2.5 | 3 | 9 | 76 | 23 | 25 | 172 | 0.187 | 1311 | 10.14 |

TABLE 3

| Example | Profile | Δ1 [%] | Δ2 [%] | Δ3 [%] | b/a | c/a | a [μm] | glass diameter [μm] | P thickness [μm] | S thickness [μm] | Fiber diameter [μm] | Transmission loss (1550 nm) [dB/km] | λ cc [nm] | MFD (1550 nm) [μm] |
|---|---|---|---|---|---|---|---|---|---|---|---|---|---|---|
| 28 | Trench type | 0.36 | 0 | −0.6 | 3 | 3.5 | 9 | 76 | 24 | 25 | 174 | 0.188 | 1327 | 10.24 |
| 29 | Trench type | 0.36 | 0 | −0.6 | 3.5 | 4 | 9 | 76 | 25 | 26 | 178 | 0.188 | 1337 | 10.27 |
| 30 | Trench type | 0.36 | 0 | −0.6 | 4 | 4.5 | 9 | 75 | 25 | 26 | 177 | 0.189 | 1354 | 10.25 |
| 31 | Trench type | 0.36 | 0 | −0.6 | 4.5 | 5 | 9 | 75 | 26 | 26 | 179 | 0.189 | 1360 | 10.28 |
| 32 | Trench type | 0.36 | 0 | −0.6 | 5 | 5.5 | 9 | 73 | 27 | 26 | 179 | 0.190 | 1372 | 10.26 |
| 33 | Trench type | 0.36 | 0 | −0.6 | 2 | 3 | 9 | 71 | 22 | 23 | 161 | 0.185 | 1334 | 9.89 |
| 34 | Trench type | 0.36 | 0 | −0.6 | 3 | 4 | 9 | 70 | 23 | 23 | 162 | 0.185 | 1412 | 10.25 |
| 35 | Trench type | 0.36 | 0 | −0.6 | 4 | 5 | 9 | 68 | 24 | 23 | 162 | 0.186 | 1474 | 10.28 |
| 36 | Trench type | 0.36 | 0 | −0.6 | 5 | 6 | 9 | 66 | 25 | 24 | 164 | 0.187 | 1500 | 10.26 |
| 37 | Trench type | 0.36 | 0 | −0.7 | 2 | 2.5 | 9 | 76 | 23 | 24 | 170 | 0.187 | 1285 | 9.91 |
| 38 | Trench type | 0.36 | 0 | −0.7 | 2.5 | 3 | 9 | 76 | 24 | 24 | 172 | 0.188 | 1315 | 10.13 |
| 39 | Trench type | 0.36 | 0 | −0.7 | 3 | 3.5 | 9 | 75 | 25 | 24 | 173 | 0.189 | 1333 | 10.23 |
| 40 | Trench type | 0.36 | 0 | −0.7 | 3.5 | 4 | 9 | 75 | 26 | 25 | 177 | 0.189 | 1345 | 10.27 |
| 41 | Trench type | 0.36 | 0 | −0.7 | 4 | 4.5 | 9 | 74 | 26 | 25 | 176 | 0.189 | 1358 | 10.25 |
| 42 | Trench type | 0.36 | 0 | −0.7 | 4.5 | 5 | 9 | 73 | 27 | 25 | 177 | 0.190 | 1370 | 10.28 |
| 43 | Trench type | 0.36 | 0 | −0.7 | 5 | 5.5 | 9 | 72 | 27 | 25 | 176 | 0.189 | 1380 | 10.26 |
| 44 | Trench type | 0.36 | 0 | −0.7 | 2 | 3 | 9 | 70 | 21 | 22 | 156 | 0.184 | 1348 | 9.86 |
| 45 | Trench type | 0.36 | 0 | −0.7 | 3 | 4 | 9 | 68 | 22 | 22 | 156 | 0.185 | 1439 | 10.25 |
| 46 | Trench type | 0.36 | 0 | −0.7 | 4 | 5 | 9 | 67 | 23 | 23 | 159 | 0.184 | 1498 | 10.28 |
| 47 | Trench type | 0.36 | 0 | −0.7 | 5 | 6 | 9 | 64 | 23 | 23 | 156 | 0.186 | 1540 | 10.26 |
| 48 | Trench type | 0.36 | 0 | −0.6 | 4 | 5 | 8 | 77 | 24 | 23 | 171 | 0.185 | 1298 | 10.01 |
| 49 | Trench type | 0.36 | 0 | −0.6 | 5 | 6 | 8 | 74 | 26 | 24 | 174 | 0.186 | 1329 | 10.01 |
| 50 | Trench type | 0.37 | 0 | −0.65 | 3 | 4 | 8 | 78 | 23 | 25 | 174 | 0.186 | 1264 | 9.93 |
| 51 | Trench type | 0.37 | 0 | −0.65 | 2.8 | 4 | 8 | 79 | 23 | 25 | 175 | 0.184 | 1287 | 9.89 |
| 52 | Trench type | 0.37 | 0 | −0.65 | 2.9 | 4 | 8 | 76 | 23 | 25 | 172 | 0.185 | 1269 | 9.92 |
| 53 | Trench type | 0.37 | 0 | −0.65 | 3 | 4.2 | 8 | 76 | 23 | 25 | 172 | 0.185 | 1300 | 9.91 |

It can be understood from Table 2 and Table 3 that the optical fiber 1 in each of the examples 1 to 53 meets the following characteristics: an average value of the relative refractive-index difference of the center core of the core portion 1a is 0.1 to 0.5%, the fiber diameter including the coating portion is equal to or smaller than 220 μm, the effective cutoff wavelength is longer than 1260 nm and smaller than 1530 nm, and a mode field diameter at 1550 nm is equal to or larger than 9 μm. Further, it can be understood that the optical fiber 1 in each of the examples 1 to 53 meets the following characteristics: a transmission loss of light at 1550 nm is equal to or smaller than 0.22 dB/km. Meanwhile, it was confirmed that, in the optical fiber 1 in each of the examples 1 to 53, a leakage loss of light at 1625 nm was equal to or smaller than 0.1 dB/km. Furthermore, it can be understood that the optical fiber 1 in each of the examples 1 to 53 meets the following characteristics: a thickness of the primary coating layer (P thickness) is equal to or larger than 10 μm and a thickness of the secondary coating layer (S thickness) is equal to or larger than 10 μm.

While the step type, the W type, and the trench type are described as examples of the refractive index profile in the embodiment as described above, the technology is applicable to other refractive index profiles, such as a segment core type or a W+side core type.

Furthermore, the present disclosure is not limited by the embodiments as described above. The present disclosure includes configurations made by appropriately combining the structural elements as described above. Moreover, additional advantages and modifications will readily occur to those skilled in the art. Therefore, the disclosure in its broader aspects is not limited to the embodiments as described above, and various modifications may be made.

An optical fiber according to the present disclosure is preferably used to the fields of optical communication, such as data communication or telecommunication.

According to the present disclosure, it is possible to adequately reduce a transmission loss even if a mode field diameter is increased.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An optical fiber comprising:
a core portion made of glass;
a cladding portion that is located on an outer periphery of the core portion and that is made of glass having a lower refractive index than a refractive index of the core portion; and
a coating portion that covers an outer periphery of the cladding portion, wherein
the optical fiber has a step-type refractive index profile,
an average value of a relative refractive-index difference of a center core of the core portion is 0.35 to 0.42%,
a fiber diameter including the coating portion is equal to or smaller than 220 µm,
an effective cutoff wavelength is longer than 1260 nm and smaller than 1530 nm, and
a mode field diameter of light at 1550 nm is equal to or larger than 9 µm.

2. The optical fiber according to claim 1, wherein a transmission loss of light at 1550 nm is equal to or smaller than 0.22 dB/km.

3. The optical fiber according to claim 1, wherein a leakage loss of light at 1625 nm is equal to or smaller than 0.1 dB/km.

4. The optical fiber according to claim 1, wherein
the coating portion includes a two-layer coating including a primary coating layer and a secondary coating layer, and
a thickness of the primary coating layer is equal to or larger than 10 µm.

5. The optical fiber according to claim 1, wherein
the coating portion includes a two-layer coating including a primary coating layer and a secondary coating layer, and
a thickness of the secondary coating layer is equal to or larger than 10 µm.

6. The optical fiber according to claim 1, wherein a diameter of a glass diameter including the core portion and the cladding portion is equal to or larger than 80 µm and equal to or smaller than 180 µm.

7. The optical fiber according to claim 1, wherein a microbending loss of light at a wavelength of 1550 nm has characteristics that conform to a standard defined by ITU-T G.652 and is equal to or less than ten times of a standard optical fiber that has a resin coating portion with an outer diameter of 250 µm on an outer periphery of a cladding portion with an outer diameter of 125 µm.

8. The optical fiber according to claim 7, wherein the microbending loss is a value measured by an abrasive-paper method.

9. The optical fiber according to claim 7, wherein the microbending loss is a value measured by a wire mesh method.

10. The optical fiber according to claim 1, wherein dispersion of light at 1550 nm is equal to or smaller than 23 ps/nm/km.

11. The optical fiber according to claim 1, wherein a dispersion slope of light at 1550 nm is equal to or smaller than 0.07 ps/nm$^2$/km.

12. The optical fiber according to claim 1, wherein a bending loss of light at 1625 nm when winding is made with a diameter of 30 mm is equal to or smaller than 2 dB/100 turn.

13. The optical fiber according to claim 1, wherein a mode field diameter of light at 1550 nm is equal to or smaller than 15 µm.

14. An optical fiber comprising:
a core portion made of glass;
a cladding portion that is located on an outer periphery of the core portion and that is made of glass having a lower refractive index than a refractive index of the core portion; and
a coating portion that covers an outer periphery of the cladding portion, wherein the optical fiber has a W-type refractive index profile,
an average value of a relative refractive-index difference of a center core of the core portion is 0.36%,
a fiber diameter including the coating portion is equal to or smaller than 220 µm,
an effective cutoff wavelength is longer than 1260 nm and smaller than 1530 nm, and
a mode field diameter of light at 1550 nm is equal to or larger than 9 µm.

15. An optical fiber comprising:
a core portion made of glass;
a cladding portion that is located on an outer periphery of the core portion and that is made of glass having a lower refractive index than a refractive index of the core portion; and
a coating portion that covers an outer periphery of the cladding portion,
wherein the optical fiber has a trench-type refractive index profile,
an average value of a relative refractive-index difference of a center core of the core portion is 0.36 to 0.37%,
a diameter of the core portion is 8 to 9 µm,
b/a is equal to or larger than 2.5 and equal to or smaller than 5, where 2b is an inner diameter of a trench layer
c/a is equal to or larger than 2.5 and equal to or smaller than 6, where 2c is an outer diameter of the trench layer,
a fiber diameter including the coating portion is equal to or smaller than 220 µm,
an effective cutoff wavelength is longer than 1260 nm and smaller than 1530 nm, and
a mode field diameter of light at 1550 nm is equal to or larger than 9 µm.

* * * * *